United States Patent
Redding et al.

(10) Patent No.: US 10,166,777 B2
(45) Date of Patent: Jan. 1, 2019

(54) METHOD OF FORMING PIEZO DRIVER ELECTRODES

(71) Applicant: XEROX CORPORATION, Norwalk, CT (US)

(72) Inventors: Gary D. Redding, Victor, NY (US); Peter J. Nystrom, Webster, NY (US); Peter M. Gulvin, Webster, NY (US); Mark A. Cellura, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 44 days.

(21) Appl. No.: 15/134,949

(22) Filed: Apr. 21, 2016

(65) Prior Publication Data

US 2017/0305159 A1    Oct. 26, 2017

(51) Int. Cl.
| | |
|---|---|
| *B41J 2/16* | (2006.01) |
| *B41J 2/14* | (2006.01) |
| *C09D 11/52* | (2014.01) |
| *C09D 11/30* | (2014.01) |
| *C09D 11/36* | (2014.01) |

(52) U.S. Cl.
CPC ......... *B41J 2/1612* (2013.01); *B41J 2/14274* (2013.01); *B41J 2/161* (2013.01); *B41J 2/164* (2013.01); *B41J 2/1607* (2013.01); *B41J 2/1618* (2013.01); *B41J 2/1621* (2013.01); *B41J 2/1623* (2013.01); *B41J 2/1628* (2013.01); *B41J 2/1631* (2013.01); *B41J 2/1632* (2013.01); *B41J 2/1635* (2013.01); *C09D 11/30* (2013.01); *C09D 11/36* (2013.01); *C09D 11/52* (2013.01); *Y10T 29/42* (2015.01); *Y10T 29/49401* (2015.01)

(58) Field of Classification Search
CPC ...... B41J 2/14274; B41J 2/1607; B41J 2/161; B41J 2/1612; B41J 2/1618; B41J 2/1621; B41J 2/1632; B41J 2/1635; B41J 2/164; B41J 2/1623; B41J 2/1628; B41J 2/1631; C09D 11/30; C09D 11/36; C09D 11/52; Y10T 29/42; Y10T 29/49401
See application file for complete search history.

(56) References Cited

U.S. PATENT DOCUMENTS

| | | | |
|---|---|---|---|
| 7,929,887 B2 | 4/2011 | Mestha et al. | |
| 8,205,971 B2 | 6/2012 | Newton et al. | |
| 8,361,350 B2 | 1/2013 | Wu et al. | |
| 8,585,187 B2 | 11/2013 | Nystrom et al. | |
| 9,139,004 B2 | 9/2015 | Redding et al. | |

(Continued)

FOREIGN PATENT DOCUMENTS

JP    2010167758 A    *    8/2010

OTHER PUBLICATIONS

Extended European Search Report dated Sep. 13, 2017 in corresponding European Application No. 17166395.8, 9 pages.

*Primary Examiner* — A. Dexter Tugbang
(74) *Attorney, Agent, or Firm* — MH2 Technology Law Group LLP

(57) ABSTRACT

A method for forming piezoelectric transducers for inkjet printheads includes: forming at least one piezoelectric layer on a substrate; forming at least one electrode pattern by depositing a conductive material on an exposed surface of the at least one piezoelectric layer; and forming a plurality of individual piezoelectric elements from the at least one piezoelectric layer before or after the forming of the at least one electrode pattern.

14 Claims, 11 Drawing Sheets

(56) References Cited

U.S. PATENT DOCUMENTS

| | | | |
|---|---|---|---|
| 2003/0204951 A1* | 11/2003 | Kitahara | Y10T 29/42 29/890.1 |
| 2004/0013794 A1 | 1/2004 | Hashimoto et al. | |
| 2004/0080568 A1* | 4/2004 | Matsuo | B41J 2/161 347/40 |
| 2004/0164650 A1 | 8/2004 | Xu et al. | |
| 2008/0138925 A1* | 6/2008 | Andrews | B41J 2/161 438/53 |
| 2008/0241414 A1* | 10/2008 | Kim | C09D 11/52 427/466 |
| 2009/0265904 A1* | 10/2009 | Kando | Y10T 29/42 29/25.35 |
| 2011/0278993 A1* | 11/2011 | Iwamoto | Y10T 29/42 310/345 |
| 2012/0242756 A1 | 9/2012 | Nystrom et al. | |
| 2013/0076839 A1 | 3/2013 | Nystrom et al. | |
| 2013/0167340 A1* | 7/2013 | Nishidate | Y10T 29/42 29/25.35 |
| 2014/0051242 A1* | 2/2014 | Lockett | C09D 11/52 438/610 |
| 2014/0354114 A1* | 12/2014 | Moriya | Y10T 29/42 310/334 |

\* cited by examiner

METHOD OF FORMING PIEZO DRIVER ELECTRODES

FIELD

Embodiments described herein relate generally to the field of printing, particularly ink jet printing, and specifically to the field of ink jet print head component manufacturing.

BACKGROUND

Printing images onto a print medium such as paper for consumer and industrial use is dominated generally by laser technology and ink jet technology. Ink jet technology has become more common as ink jet printing resolution and quality have increased. Ink jet printers typically use either thermal ink jet technology or piezoelectric technology. Even though they are more expensive to manufacture than thermal ink jets, piezoelectric ink jets are generally favored because they can use a wider variety of inks.

Piezoelectric ink jet printheads include an array of piezoelectric transducers attached to a flexible membrane. Other printhead structures can include one or more laser-patterned dielectric standoff layers and a flexible printed circuit ("flex circuit") or printed circuit board ("PCB") electrically coupled with each transducer. A printhead can further include a body plate, an inlet/outlet plate, and an aperture plate, each of which can be manufactured from stainless steel. The aperture plate includes an array of nozzles (i.e., one or more openings, apertures, or jets) through which ink is dispensed during printing.

The transducers of a printhead generally reside adjacent to a pressure chamber. A set of signals generally cause the transducer to act against a diaphragm. One signal causes the transducer to move the diaphragm in a direction away from the aperture, filling the pressure chamber with ink. A second signal, typically of opposite polarity of the first, causes the diaphragm to move the other direction, pushing ink out of the pressure chamber through the aperture. In other words, during use of a piezoelectric printhead, a voltage is applied to a piezoelectric transducer, typically through electrical connection with a flex circuit electrode electrically coupled to a voltage source, which causes the piezoelectric transducer to bend or deflect, resulting in a flexing of the diaphragm. Diaphragm flexing by the piezoelectric transducer increases pressure within an ink chamber and expels a quantity of ink from the chamber through a particular nozzle in the aperture plate. As the diaphragm returns to its relaxed (i.e., unflexed) position, it reduces pressure within the chamber and draws ink into the chamber from a main ink reservoir through an opening to replace the expelled ink.

FIGS. 1A and 1B illustrate one example of a single inkjet ejector 110 that is suitable for use in an inkjet array of a print head. The inkjet ejector 110 has a body 122 that is coupled to an ink manifold 112 through which ink is delivered to multiple inkjet bodies. The body also includes an ink drop-forming orifice or nozzle 114 through which ink is ejected. In general, the inkjet print head includes an array of closely spaced inkjet ejectors 110 that eject drops of ink onto an image receiving member (not shown), such as a sheet of paper or an intermediate member.

Ink flows from the manifold to nozzle in a continuous path. Ink leaves the manifold 112 and travels through a port 116, an inlet 118, and a pressure chamber opening 120 into the body 122, which is sometimes called an ink pressure chamber. Ink pressure chamber 122 is bounded on one side by a flexible diaphragm 130. A piezoelectric transducer is secured to diaphragm 130 by any suitable technique and overlays ink pressure chamber 122. Metal film electrode layers 134, to which an electronic transducer driver 136 can be electrically connected, can be positioned on either side of a piezoelectric element 132. The metal film layers can be patterned, in a manner such that the piezoelectric transducers can be addressed individually or as groups with various numbers of elements in each group.

Ejection of an ink droplet is commenced with a firing signal. The firing signal is applied across metal electrode layers 134 to excite the piezoelectric element 132, which causes the transducer to bend. Because the transducer is rigidly secured to the diaphragm 130, the diaphragm 130 deforms to urge ink from the ink pressure chamber 122 through the outlet port 124, outlet channel 128, and nozzle 114. The expelled ink forms a drop of ink that lands onto an image receiving member. Refill of ink pressure chamber 122 following the ejection of an ink drop is augmented by reverse bending of piezoelectric element 132 and the concomitant movement of diaphragm 130 that draws ink from manifold 112 into pressure chamber 122.

Generally, one transducer exists for each aperture and pressure chamber, and the array of transducers aligns to the arrays of pressure chambers. The desire for high resolution print images has driven the density of the array of apertures increasingly higher. The array of transducers has to match this higher density. For example, the number of apertures corresponds to the number of body cavities, which in turn correspond to the number of transducers. These higher densities lead to extremely tight tolerances during manufacture of a print head.

Piezoelectric ink jet printheads may include an array of piezoelectric elements to form the piezoelectric transducers. One process to form the array can include detachably bonding a blanket piezoelectric layer to a transfer carrier with an adhesive, and dicing the blanket piezoelectric layer to form a plurality of individual piezoelectric elements. A plurality of dicing saw passes can be used to remove all the piezoelectric material between adjacent piezoelectric elements to provide the correct spacing between each piezoelectric element.

A top electrode formed on each transducer provides electric coupling of the piezoelectric transducers to corresponding voltage sources. In current methods for fabrication, the top electrode may be formed in a plating process in which a blanket coating of electrode metal is deposited over an entire slab of piezoelectric material, followed by dicing of the slab to form individual actuators (i.e., individual actuators are defined by dicing rows and columns out of the electrode coated piezo material). One issue with such a method of blanket coating is that the dicing step stresses the adhesion of the metal electrode due to physical contact with the saw and exposure to high pressure cooling water. Another issue with such a method of blanket coating is related to the handling of thin piezoelectric material. To achieve higher density transducer arrays, the piezoelectric material must be smaller and thinner. Blanket coating two sides of very thin piezoelectric material (e.g., 0.010 mm-0.030 mm) can be extremely challenging. Other challenges for a blanket coating process are presented when piezoelectric transducers are fabricated by using a thick-film process: a process by which there is no slab to start with and the piezoelectric material is stenciled or printed as individual tiles onto the substrate. With a thick-film process, blanket coating of all of the singulated tiles would result in unintended electrical paths (e.g., actuator to actuator, actuator to ground, etc.)

What is needed, therefore, is a method for assembling a printhead that minimizes or eliminates use of blanket coating of piezoelectric stacks in order to minimize or eliminate the above issues.

SUMMARY

In an embodiment, there is a method for forming piezoelectric transducers for inkjet printheads. The method comprises forming at least one piezoelectric layer on a substrate; forming at least one electrode pattern by depositing a conductive material on an exposed surface of the at least one piezoelectric layer; and forming a plurality of individual piezoelectric elements from the at least one piezoelectric layer before or after the forming of the at least one electrode pattern.

In another embodiment, there is an inkjet printhead. The inkjet printhead comprises: at least one inkjet ejector, wherein the inkjet ejector comprises a body coupled to an ink manifold and an ink drop-forming nozzle. The inkjet printhead further comprises a continuous conduit extending between the manifold and the nozzle, the conduit comprising a pressure chamber bounded by a flexible diaphragm. The inkjet printhead further comprises a piezoelectric transducer secured to the diaphragm. The piezoelectric transducer comprises a first electrode, a second electrode and at least one piezoelectric layer disposed between the first and second electrodes. The piezoelectric transducer comprises one of a plurality of individual piezoelectric elements formed by a method comprising: forming at least one piezoelectric layer on a substrate, and forming a plurality of patterned electrode by depositing a conductive material on an exposed surface of the at least one piezoelectric layer, wherein the first electrode comprises one of the plurality of patterned electrodes, and wherein the second electrode comprises the same or a different material as the first electrode.

At least one advantage of at least one of the embodiments provides for the forming of electrical contacts on thin piezoelectric slabs having thicknesses of about 0.010 mm to about 0.030 mm.

At least one advantage of at least one of the embodiments provides for the forming of electrical contacts on thick-film piezo transducers.

At least one advantage of at least one of the embodiments provides for forming a piezoelectric slab on a transfer substrate and transferring the piezoelectric slab onto a component of an inkjet printhead as the substrate, such as a printhead diaphragm.

At least one advantage of at least one of the embodiments provides for forming a piezoelectric slab on a printhead as the substrate, such as a printhead diaphragm.

At least one advantage of at least one of the embodiments provides for minimizing or eliminating shorting that may occur upon forming a blanket conductive layer over singulated transducers.

At least one advantage of at least one of the embodiments provides for options in the order of steps in a printhead manufacturing process, such as with respect to forming individual piezoelectric elements of the printhead transducers, for example, via the dicing of at least one semiconductor layer before or after forming a patterned electrode thereon.

Additional advantages of the embodiments will be set forth in part in the description which follows, and in part will be understood from the description, or may be learned by practice of the embodiments. The advantages will be realized and attained by means of the elements and combinations particularly pointed out in the appended claims.

It is to be understood that both the foregoing general description and the following detailed description are exemplary and explanatory only and are not restrictive of the embodiments, as claimed.

The accompanying drawings, which are incorporated in and constitute a part of this specification, illustrate embodiments and together with the description, serve to explain the principles of the embodiments.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. $-1$, $-2$, $-3$, $-10$, $-20$, $-30$, etc.

The following embodiments are described for illustrative purposes only with reference to the figures. Those of skill in the art will appreciate that the following description is exemplary in nature, and that various modifications to the parameters set forth herein could be made without departing from the scope of the present embodiments. It is intended that the specification and examples be considered as examples only. The various embodiments are not necessarily mutually exclusive, as some embodiments can be combined with one or more other embodiments to form new embodiments.

Figure 1A:
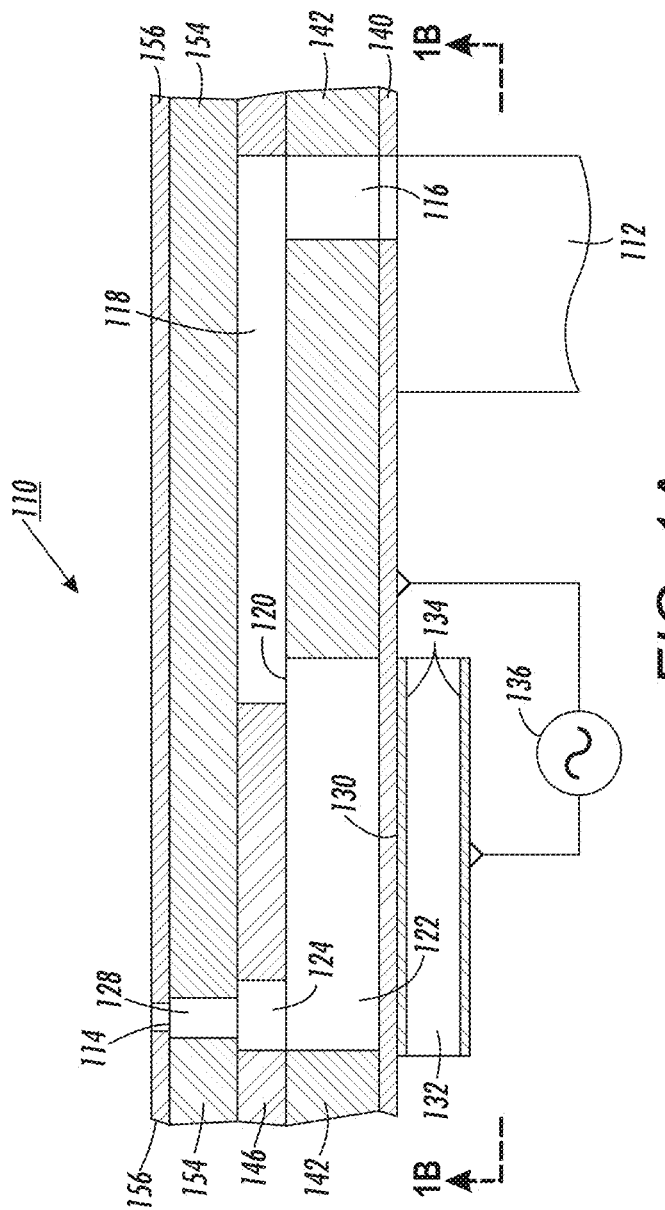
FIG. 1A is a schematic side-cross-sectional view of a prior art embodiment of an inkjet.
Figure 1B:
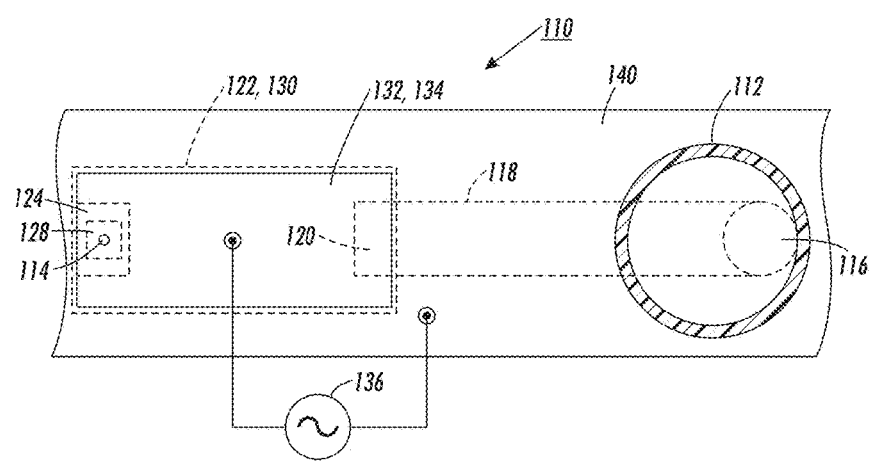
FIG. 1B is a schematic view of the prior art embodiment of the inkjet of FIG. 1A.

Embodiments disclosed herein are directed to, but not limited to, forming piezoelectric transducers for use in inkjet printheads and in particular, forming electrodes of the transducers by depositing conductive material in a predetermined pattern. In an example, the methods described here can provide for an inkjet printhead, such having features depicted in FIGS. 1A-1B but having at least one piezoelectric transducer disposed therein formed according to a method described herein.

Embodiments of the present teachings can include methods for forming a piezoelectric transducer for use with an inkjet ejector of an inkjet printhead. FIGS. 2A-2D are flow charts that illustrate methods 300, 400, 500 and 600 of forming piezoelectric transducers according to various embodiments such as those illustrated as various stages of fabrication in FIGS. 3A-3D, FIGS. 4A-4C, FIGS. 5A-5D and FIGS. 6A-6C, respectively. In each method, a conductive material, such as a conductive ink or other material as described below, is used for forming the piezo electrode. In some embodiments, such as methods 300 and 400 and depicted as various stages of fabrication at FIGS. 3A-3D and FIGS. 4A-4C, respectively, the conductive material is deposited through openings of a pattern-mask. In some embodiments, such as methods 500 and 600 and depicted as various stages of fabrication at FIGS. 5A-5D and FIGS. 6A-6C, the conductive material is deposited using a printhead capable of jetting conductive inks. In any of the embodiments, a print pattern is achieved such that conductive material is deposited at preselected locations and forms patterned electrodes of a piezo actuator/transducer.

In some embodiments, such as methods 300 and 500 which may be depicted as various stages of fabrication at FIGS. 3A-3D and FIGS. 5A-5D, the conductive material is deposited onto individual piezoelectric elements formed from a piezoelectric slab which may be one or more of a piezoelectric layer. The conductive material may be deposited either before or after forming individual piezoelectric elements (i.e., individual actuators), via, for example, dicing the piezoelectric slab. This allows for forming the top electrode on either diced or thick-film piezoelectric elements. In some embodiments, such as methods 400 and 600, which may be depicted as various stages of fabrication at FIGS. 4A-4C and FIGS. 6A-6C, the conductive material may be deposited either before or after forming the individual piezoelectric elements, that is, prior to or after dicing the piezoelectric slab into individual actuators. A hold back zone may be preselected at designated locations where conductive material is not to be deposited. This avoids the possibility of smearing electrode material into unintended electrical paths (e.g., actuator to actuator, actuator to ground, etc.). While not limited to any particular method or embodiment, by forming piezo electrodes from conductive inks that are deposited according to predetermined patterns, electrode deposition can be performed downstream in the build process.

Figure 2A:
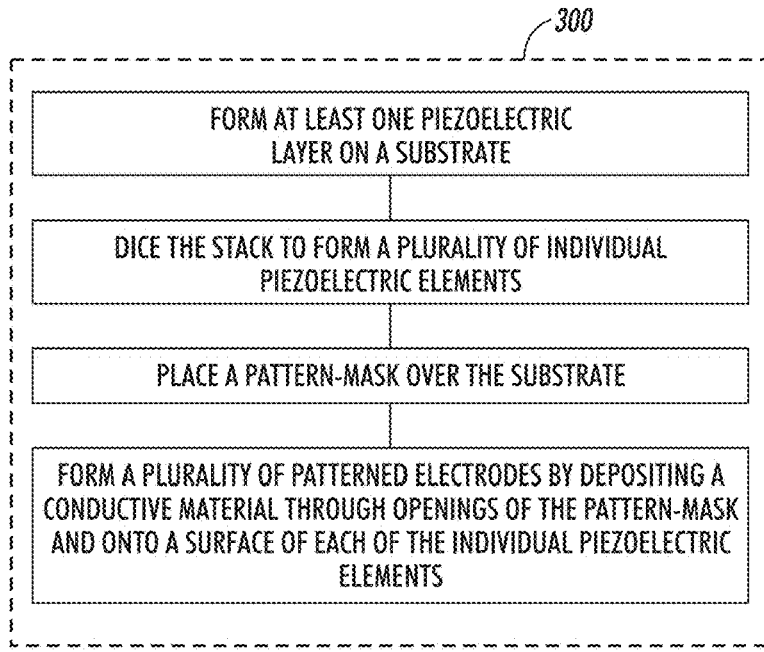
FIGS. 2A-2D are flow charts depicting methods of forming piezoelectric transducers according to various embodiments.

In forming a piezoelectric transducer for inkjet printheads according to an embodiment, a method 300 is illustrated as a flowchart in FIG. 2A and as various stages of fabrication in FIGS. 3A-3D. The method 300 includes forming at least one piezoelectric layer on a substrate, which may be a transfer carrier that may include an adhesive layer or may be a printhead diaphragm; dicing the stack (if necessary) to form a plurality of individual piezoelectric elements; and forming at least one electrode pattern, for example, a plurality of patterned electrodes, by depositing a conductive material on an exposed surface of the at least one piezoelectric layer. Further, a pattern-mask may be placed over the substrate such that at least one electrode pattern is formed by depositing the conductive material through openings between portions of the pattern-mask and onto an exposed surface of the at least one piezoelectric layer. The pattern-mask can overlap the underlying piezoelectric layer in order to form a 'hold-back' zone that prevents contact of the dicing blade with the deposited electrode material FIG. 3A-3D illustrate cross-sectional "in-process" views of various stages of fabrication based on method 300. At FIG. 3A, at least one piezoelectric layer 20 is formed on a substrate 22. The substrate may be a transfer carrier or a printhead diaphragm. The at least one piezoelectric layer may be bonded to the substrate via an adhesive 24. In one embodiment, a plurality of individual piezoelectric elements 20' are formed from the at least one piezoelectric element layer 20, for example, via dicing the piezoelectric layer 20. Accordingly the structure of FIG. 3B may be attained after forming the FIG. 3A structure. Alternatively, the step in FIG. 3A may be omitted and the plurality of individual piezoelectric elements 20' shown in FIG. 3B may instead be formed directly by providing at least one piezoelectric layer in a predetermined pattern.

Figure 3A:
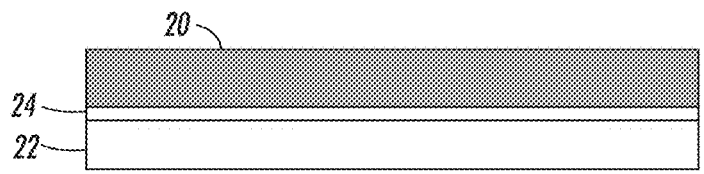
FIGS. 3A-3D illustrate cross-sectional views at stages of production in a method for fabricating a piezoelectric transducer according to an embodiment such as the method described in the flowchart of FIG. 2A.
Figure 3B:
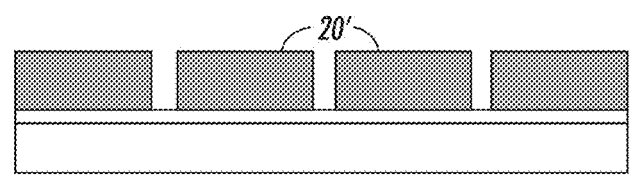
Figure 3C:
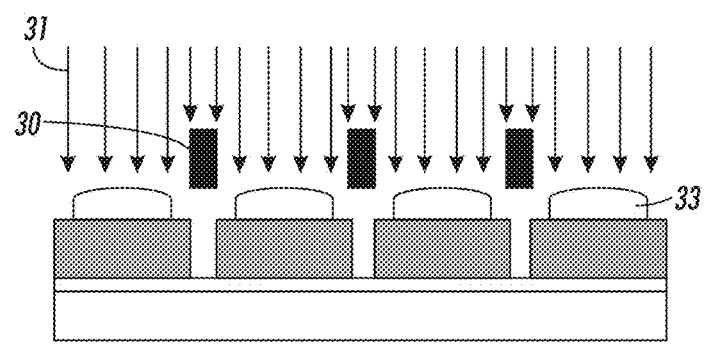
Figure 3D:
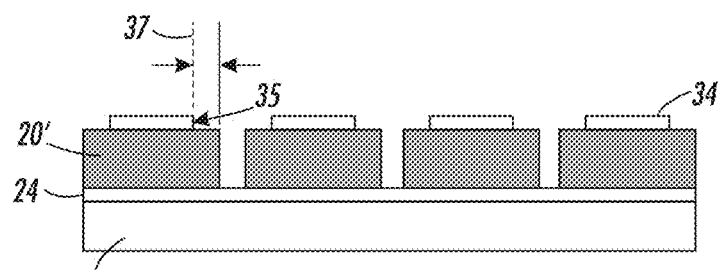

After forming the individual piezoelectric elements 20', at least one electrode pattern 34 may be formed on exposed surfaces of the at least one piezoelectric material. For example, as shown in FIG. 3C, a quantity of conductive material 33 is deposited on a top surface of each individual piezoelectric element 20' to form electrode pattern 34 as shown in FIG. 3D. That is, the conductive material 33 may be deposited in a pre-determined layout, for example, the predetermined pattern defined by openings between portions of a pattern mask 30. It is noted that pattern-mask 30 may block conductive material from being formed in a hold-back zone 35 that may run the periphery of one or more of the plurality of piezoelectric element 20'. The hold back zone 35 extends across a hold-back distance (i.e., the distance defined by the horizontal arrows at 37 in FIG. 3D) which may provide for an additional buffer to prevent shorting between electrodes.

Figure 2B:
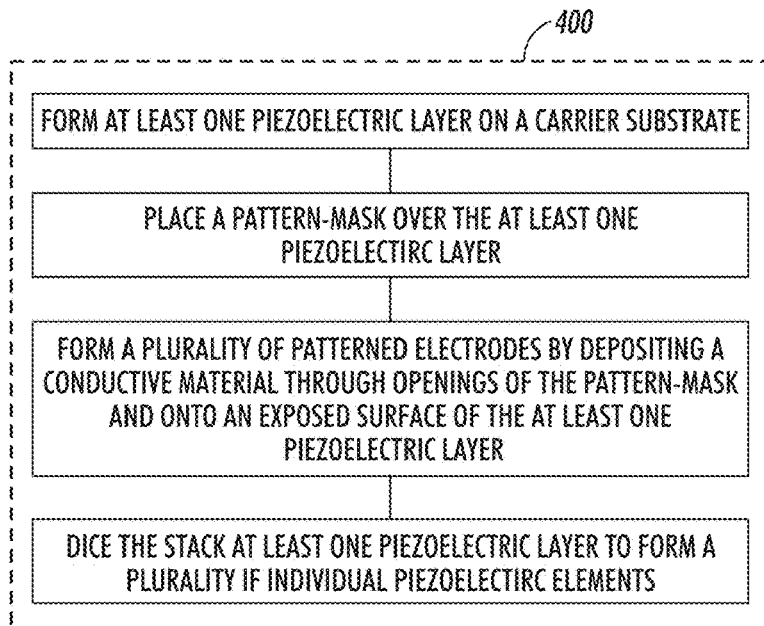
Figure 4A:
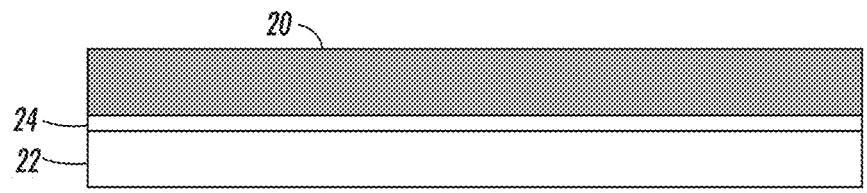
FIGS. 4A-4C illustrate cross-sectional views at stages of production in a method for fabricating a piezoelectric transducer according to an embodiment such as the method described in the flowchart of FIG. 2B.
Figure 4B:
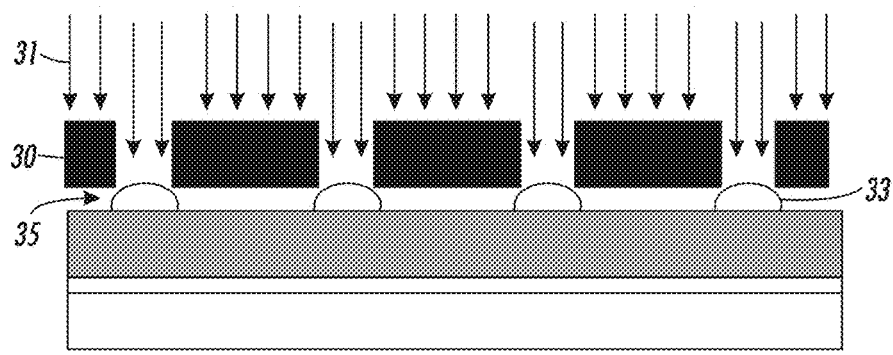
Figure 4C:
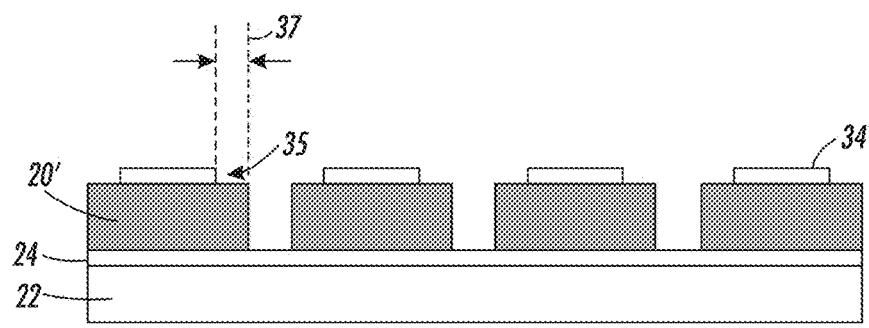

In forming a piezoelectric transducer for inkjet printheads according to another embodiment, a method 400 is illustrated as a flowchart in FIG. 2B and as various stages of fabrication in FIGS. 4A-4C. The method 400 includes forming a at least one piezoelectric layer on a substrate, which may be a transfer carrier that may include an adhesive layer or may be a printhead diaphragm; forming at least one electrode pattern, for example, a plurality of patterned electrodes; and forming a plurality of individual piezoelectric elements. The plurality of patterned electrodes may be formed by depositing a conductive material on an exposed surface of the at least one piezoelectric layer. Further, a pattern-mask may be placed over the substrate such that at least one electrode pattern is formed by depositing the conductive material through openings between portions of the pattern-mask and onto the exposed surface of the at least one piezoelectric layer. The pattern-mask can overlap the underlying piezoelectric stack in order to form a 'hold-back' zone that prevents shorting between electrodes. The forming of the plurality of individual piezoelectric elements may be performed by dicing the at least one piezoelectric layer, or by forming the at least one piezoelectric layer as a pattern of individual elements.

FIG. 4A-4C illustrate cross-sectional "in-process" views of various stages of fabrication based on method 400 of FIG. 2B. At FIG. 4A, at least one piezoelectric layer 20 is formed on a substrate 22. The substrate may be a transfer carrier or a printhead diaphragm. The at least one piezoelectric layer may be bonded to the substrate via an adhesive 24. After forming the FIG. 4A structure, a pattern mask 30 is placed over the piezoelectric element layer 20 and conductive material 30 is deposited 31 so as to form a pattern of top electrodes 34 on the exposed surfaces of piezoelectric element layer 20. For example, as shown in FIG. 4B-4C, a quantity of conductive material 33 is deposited on a top surface of piezoelectric element layer 20 and forms electrode pattern 34, which may be used as the top electrode of a transducer in a printhead. That is, as shown in FIG. 4B, the conductive material 33 may be deposited in a pre-determined layout, for example, the predetermined pattern defined by openings between portions of a pattern mask 30, to form the electrodes. The piezoelectric element layer 20 may be diced to form a plurality of individual piezoelectric elements 20' as depicted in FIG. 4C. It is noted that pattern-mask 30 may block conductive material from being formed in a hold-back zone 35 that may run the periphery of one or more of the plurality of piezoelectric element 20'. The hold back zone 35 extends across a hold-back distance (i.e., the distance defined by the horizontal arrows at 37 in FIG. 4C) which provides an additional buffer to prevent shorting between electrodes.

Accordingly, in some embodiments, such as methods 300 and 400 which are depicted as various stages of fabrication in FIGS. 3A-3D and 4A-4C, respectively, a patterned mask 30 can be used in conjunction with the depositing 31 of the conductive material 33 to provide at least one of an electrode pattern 34.

In some embodiments, such as methods 500 and 600 which are depicted as various stages of fabrication in FIGS. 5A-5D and 6A-6C, respectively, a patterned mask may not be required for depositing of the conductive material. For example, forming of the electrodes may be performed by depositing conductive material via a printhead which may jet droplets of jettable conductive material according to predetermined pattern defined by, for example, printing software.

Figure 2C:
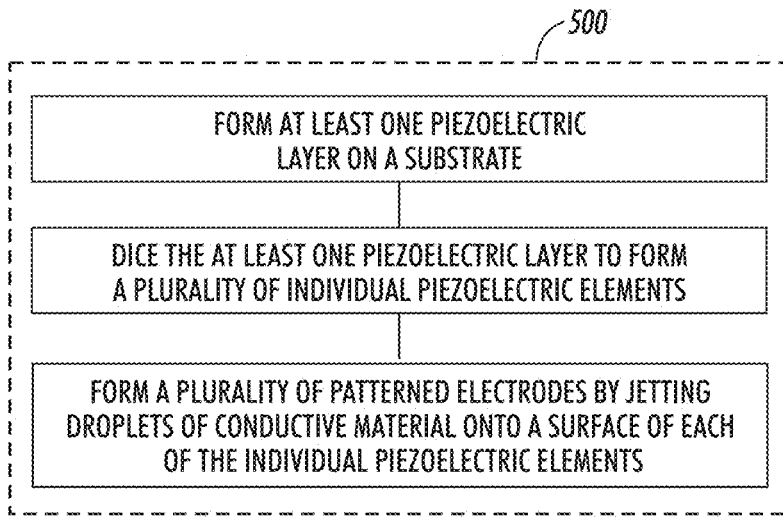

For example, FIGS. 5A-5D illustrate cross-sectional "in-process" views of various stages of fabrication based on method 500 of FIG. 2C. At FIG. 5A, The method 500 includes forming a at least one piezoelectric layer on a substrate, which may be a transfer carrier that may include an adhesive layer or may be a printhead diaphragm; forming a plurality of individual piezoelectric elements; and forming a plurality of electrodes by jetting droplets of conductive material onto a surface of each of the individual piezoelectric elements. The forming of the plurality of individual piezoelectric elements may be performed by dicing the at least one piezoelectric layer, or by forming the at least one piezoelectric layer as a pattern of individual elements. The plurality of electrodes may be formed in a predetermined patterned and areas on which no conductive material may form a 'hold-back' zone that prevents shorting between electrodes.

FIG. 5A-5D illustrate cross-sectional "in-process" views of various stages of fabrication based on method 500. At FIG. 5A, at least one piezoelectric layer 20 is formed on a substrate 22. The substrate may be a transfer carrier or a printhead diaphragm. The at least one piezoelectric layer may be bonded to the substrate via an adhesive 24. In one embodiment, a plurality of individual piezoelectric elements 20' are formed from the at least one piezoelectric element layer 20, for example, via dicing the piezoelectric layer 20. Accordingly the structure of FIG. 5B may be attained after forming the FIG. 5A structure. Alternatively, the step in FIG. 5A may be omitted and the plurality of individual piezoelectric elements 20' shown in FIG. 5B may instead be formed directly by providing at least one piezoelectric layer in a predetermined pattern of the individual piezoelectric elements.

Figure 5A:
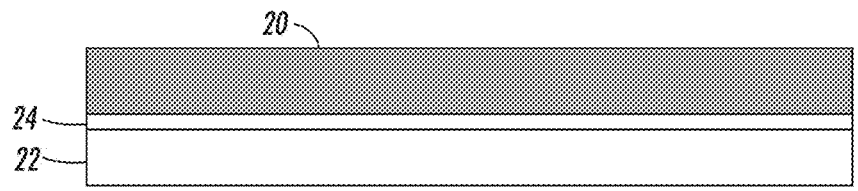
FIGS. 5A-5D illustrate cross-sectional views at stages of production in a method for fabricating a piezoelectric transducer according to an embodiment such as the method described in the flowchart of FIG. 2C.
Figure 5B:
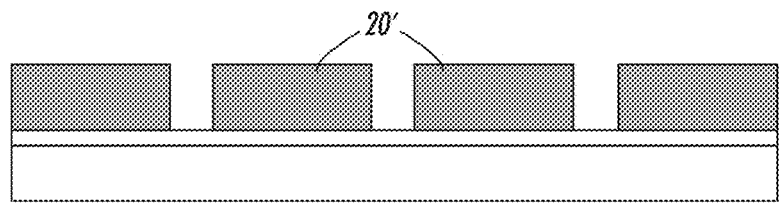
Figure 5C:
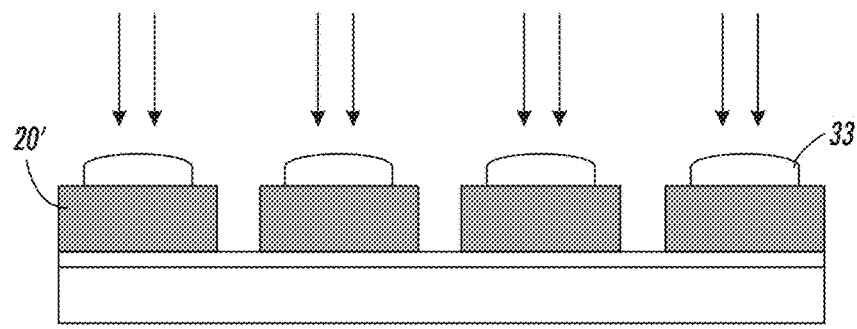
Figure 5D:
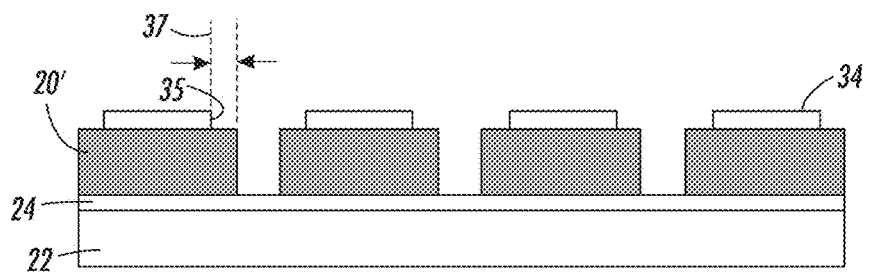

After forming the individual piezoelectric elements 20', at least one electrode pattern 34 may be formed on exposed surfaces of the at least one piezoelectric material. For example, as shown in FIG. 5C, a quantity of conductive material 33 is deposited on a top surface of each piezoelectric element 20' and forms at least one electrode pattern 34 as shown in FIG. 5D. That is, the conductive material 33 may be deposited in a pre-determined layout, for example, as droplets jetted from an inkjet printhead (not shown).

Figure 2D:
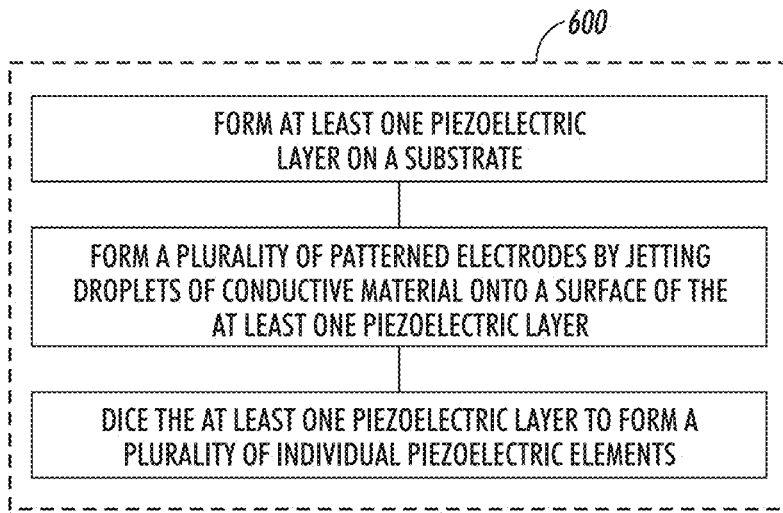
Figure 6A:
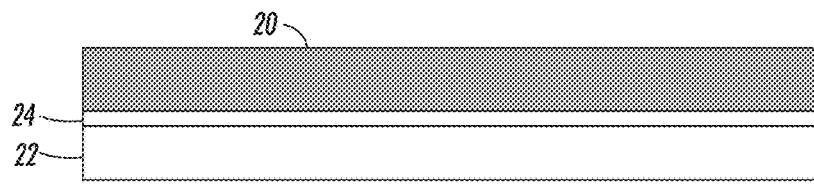
FIGS. 6A-6C illustrate cross-sectional views at stages of production in a method for fabricating a piezoelectric transducer according to an embodiment such as the method described in the flowchart of FIG. 2D.
Figure 6B:
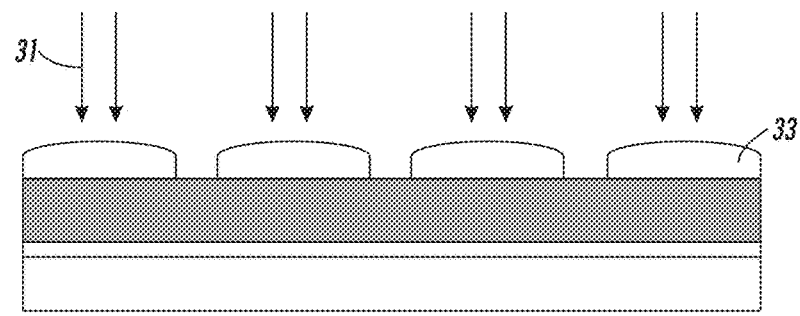
Figure 6C:
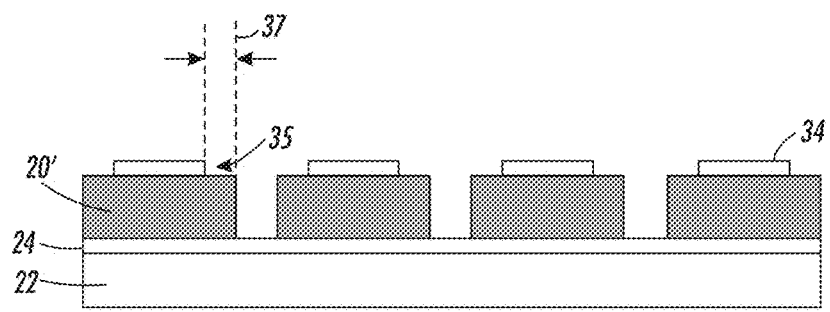

FIGS. 6A-6C illustrate cross-sectional "in-process" views of various stages of fabrication based on method 600 of FIG. 2D. The method 600 includes forming a at least one piezoelectric layer on a substrate, which may be a transfer carrier that may include an adhesive layer or may be a printhead diaphragm portion of an inkjet printhead; forming at least one electrode pattern, for example, a plurality of patterned electrodes; and forming a plurality of individual piezoelectric elements. The plurality of patterned electrodes may be formed by depositing a conductive material on an exposed surface of the at least one piezoelectric layer, for example, by jetting droplets of conductive material onto a surface of the individual piezoelectric elements in a predetermined pattern. Surface portions on which conductive material is not deposited may form a 'hold-back' zone that prevents shorting between electrodes. The forming of the plurality of individual piezoelectric elements may be performed by dicing the at least one piezoelectric layer, or by forming the at least one piezoelectric layer as a pattern of individual elements.

At FIG. 6A, at least one piezoelectric layer 20 is formed on a substrate 22. The substrate may be a transfer carrier or a printhead diaphragm. The at least one piezoelectric layer may be bonded to the substrate via an adhesive 24. After forming the FIG. 6A structure, conductive material 33 is deposited so as to form at least one electrode pattern 34 on the exposed surfaces of piezoelectric element layer 20. For example, as shown in FIG. 6B-6C, a quantity of conductive material 33 is deposited on a top surface of piezoelectric element layer 20 to form the at least one electrode pattern 34 which may be used as the top electrode of a transducer in an inkjet printhead. That is, as shown in FIG. 6B, the conductive material 33 may be deposited in a pre-determined layout, for example, the predetermined pattern defined by jetting droplets of conductive material from a piezoelectric inkjet printhead. After forming the at least one electrode pattern 34, the piezoelectric element layer 20 may be diced to form a plurality of individual piezoelectric elements 20' as depicted in FIG. 6C. It is noted that the printhead may deposit conductive material in a pattern such that areas where conductive material is not deposit form a hold-back zone 35 that may that prevents shorting of electrodes between the individual piezoelectric element 20'. That is, the conductive material 33 may be deposited to cover less than all of the exposed surface of the individual piezoelectric elements to form a hold-back zone defined by the horizontal arrows at 37 in FIG. 6C.

Figure 7A:
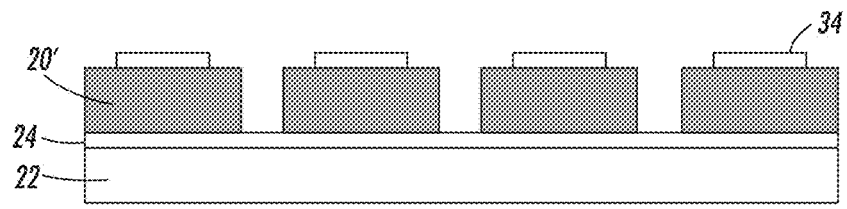
FIGS. 7A-7D illustrate cross-sectional views at stages of production in a method for fabricating a piezoelectric transducer according to an embodiment.
Figure 7B:
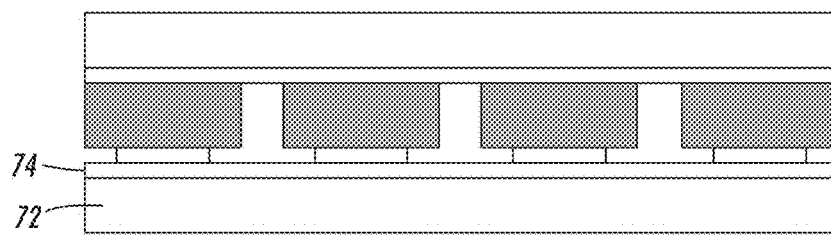
Figure 7C:
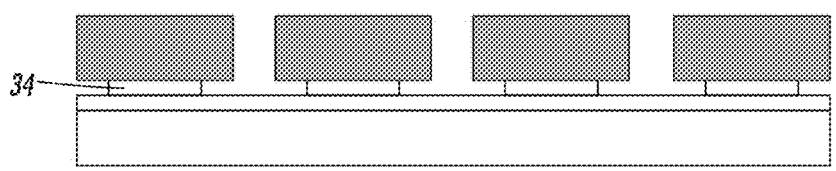
Figure 7D:
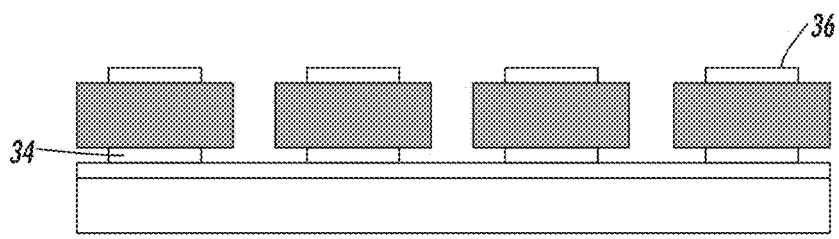

In the case wherein the substrate 22 is a transfer substrate, any of the resulting structures of FIGS. 3D, 4C, 5D or 6C may be further processed in order to add a bottom electrode on an opposing side of at least one piezoelectric layer to the electrode pattern 34 as illustrated in FIGS. 7A-7C. For example, a structure comprising the individual piezoelectric elements 20' with electrode pattern 34 formed thereon may be transported on substrate 22 (e.g., a carrier substrate with the individual piezoelectric elements attached thereto by adhesive layer 24) and flip bonded via a second adhesive layer 74 onto a second substrate 72, such as the plurality of top electrodes 34 contacts the adhesive layer 74. The substrate 22 and adhesive 24 may be removed, thereby exposing a released surface of the piezoelectric elements 20' to the patterned electrode 34. A plurality of electrodes 36 can be deposited on the released surfaces of the piezoelectric elements 20' via similar methods as for electrodes 34 as described in methods 300 or 500 above. While the methods 300, 400, 500 and 600 and corresponding illustrations in FIGS. 3A-3D, 4A-4C, 5A-5D and 6A-6C, respectively, depict the at least one piezoelectric layer as being formed into individual piezoelectric elements, the invention is not so limited. For example, electrode patterns 34 may be formed on at least one continuous piezoelectric layer that is not diced into or formed as a pattern of individual piezoelectric elements. Accordingly, the addition of opposing electrodes, such as depicted in steps in FIGS. 7A-7D may be performed by transferring at least one continuous layer piezoelectric layer with at least one electrode pattern 34 formed thereon from a transfer substrate onto another substrate such as a component of an inkjet printhead stack, for example, a diaphragm.

In an alternative embodiment, at least one transducer may be formed directly on components of a piezoelectric ink jet, such as on a body plate having a diaphragm formed thereon. At least one piezoelectric layer can be formed on a diaphragm as individual piezoelectric elements or as a continuous piezoelectric layer that is then diced to form the individual piezoelectric elements, for example, by dicing directly on a diaphragm of a print head, rather than on a transfer substrate, as described in U.S. Pat. No. 9,139,004, the contents of which are hereby incorporated by reference herein in its entirety.

Figure 8A:
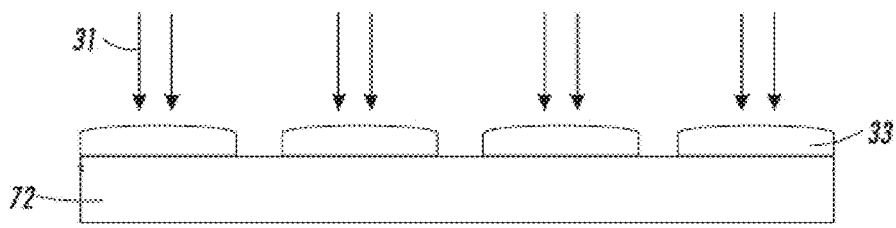
FIGS. 8A-8E illustrate cross-sectional views at stages of production in a method for fabricating a piezoelectric transducer according to an embodiment.
Figure 8B:
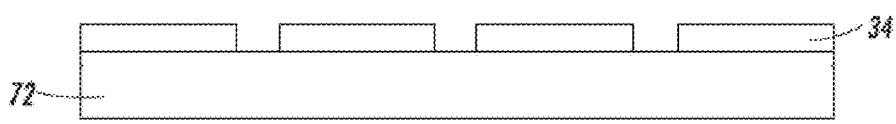
Figure 8C:
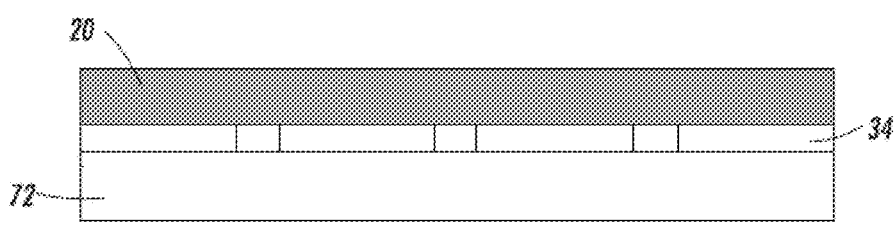
Figure 8D:
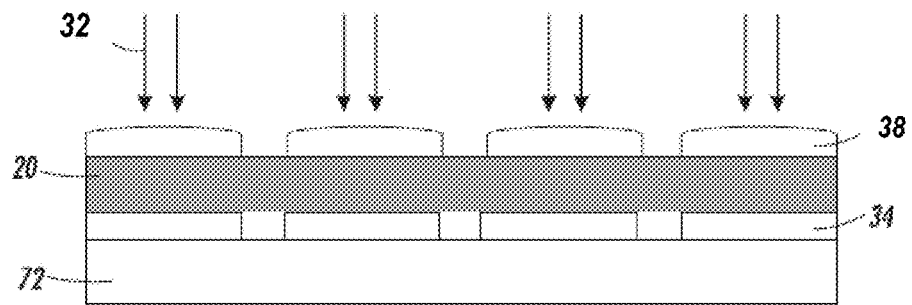
Figure 8E:
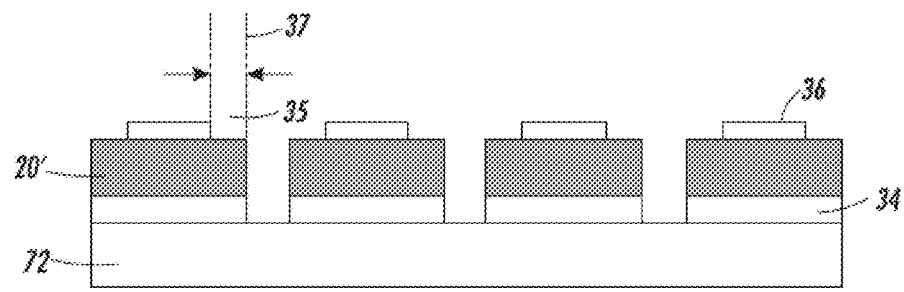

Accordingly, in a method illustrated in the cross-sectional views shown in FIG. 8A-8E, a conductive material 33 is deposited 31 on a substrate comprising a diaphragm 72 of a body plate so as to form at least one patterned electrode 34 (with an step illustrated in FIG. 8B to at least partially cure or dry the conductive material). At least one piezoelectric layer 20 may then be formed on the at least one patterned electrode 34 as shown in FIG. 8C. Conductive material 38 may be deposited 32 on the piezoelectric layer 20 as shown in FIG. 8D so as to form at least one electrode pattern 36. The method continues by forming a plurality of individual piezoelectric elements 20' from the at least one piezoelectric layer 20. The plurality of individual piezoelectric elements 20' may be formed by dicing. Accordingly, in order to avoid, minimize or eliminate problems associated with shorting due to blank deposition processes, portions of the piezoelectric layer on which the conductive material 33 is not deposited may define a hold back zone 37. It is noted that although FIGS. 8A-8E show a plurality of individual piezoelectric elements 20' being formed from a slab comprising at least one semiconductor layer after depositing conductive material 38, the embodiments are not so limited. For example, the at least one piezoelectric layer could be diced after being formed on electrodes 34 but before depositing of the conductive material 38 (i.e., the dicing would be performed between FIGS. 8C-8D) instead of at FIG. 8E as shown.

The dicing of the various embodiments can be performed using mechanical techniques such as with a saw such as a wafer dicing saw, using a dry etching process, using a laser ablation process, etc. To ensure complete separation of each adjacent piezoelectric element 20', the dicing process can terminate after removing a portion of the adhesive 24.

The at least one piezoelectric layer 20 of the embodiments can include multiple layers of the same or different piezoelectric materials, including ceramic piezoelectric elements such as soft PZT (lead zirconate titanate) and hard PZT, or other functional ceramic materials, such as antiferroelectric materials, electrostrictive materials, and magnetostrictive materials. The composition of the piezoelectric ceramic elements can also vary, including doped or undoped, e.g., lead zirconate titanate (PZT), lead titanate, lead zirconate, lead magnesium titanate and its solid solutions with lead titanate, lithium niobate, and lithium tantanate, or any lead-free piezoelectric material. The piezo element layer 20 can have a thickness in the range of from about 0.010 mm to about 0.150 mm, for example, from about 0.010 mm to about 0.03 mm to function as an inner dielectric of, for example, a transducer.

The conductive material of the embodiments shown as the conductive material 33 or the conductive material 38 as used for forming electrodes, such as electrode 34 or electrode 36 as described above, can be a conductive ink, a conductive epoxy, a conductive paste, or any conductive material that can be deposited using an inkjet printhead. The conductive material can be a solution processable or printable silver-base conducting material. In an example, the conductive material 33 and the conductive material 38 may comprise the same material. Alternatively, the conductive material 33 and the conductive material 38 may comprise different materials. In an example, the conductive material 33, the conductive material 36, or both may be a silver nanoparticle ink or a silver nanoparticle paste. The silver nanoparticle ink may comprise a composition that includes silver nanoparticles, a hydrocarbon solvent, and an alcohol co-solvent, with the silver nanoparticles being present in an amount of at least 35 weight percent of the ink composition; and wherein the weight ratio of hydrocarbon solvent to alcohol co-solvent is from about 2:1 to about 1:1. The silver nanoparticle ink composition may have a viscosity of from about 2 to about 15 centipoise, and/or a surface tension of from about 22 to about 35 millinewtons/meter. In embodiments, the silver nanoparticles have a particle size of from about 0.5 nm to about 1000 nm, from about 1 nm to about 500 nm, from about 1 nm to about 100 nm, and particularly from about 1 nm to about 20 nm. The particle size is defined herein as the average diameter of the silver nanoparticles, as determined by TEM (transmission electron microscopy). The silver nanoparticles can have a particle size from about 1 nm to about 50 nm. They can also have a low polarity surface. The hydrocarbon solvent may be an aliphatic hydrocarbon having at least 5 carbon atoms to about 20 carbon atoms, such as pentane, hexane, heptane, octane, nonane, decane, undecane, dodecane, tridecane, tetradecane, pentadecane, hexadecane, heptadecane, dodecene, tetradecene, hexadecene, heptadecene, octadecene, terpinenes, isoparaffinic solvents, and their isomers. Alternatively, the hydrocarbon solvent can be an aromatic hydrocarbon having from about 7 carbon atoms to about 18 carbon atoms, such as toluene, xylene, ethyltoluene, mesitylene, trimethylbenzene, diethylbenzene, tetrahydronaphthalene, and ethylbenzene. The alcohol co-solvent has at least 6 carbon atoms and can be, for example, hexanol, heptanol, octanol, nonanol, decanol, undecanol, dodecanol, tetradecanol, and hexadecanol; a diol such as hexanediol, heptanediol, octanediol, nonanediol, and decanediol; an alcohol comprising an unsaturated double bond, such as farnesol, dedecadienol, linalool, geraniol, nerol, heptadienol, tetradecenol, hexadeceneol, phytol, oleyl alchohol, dedecenol, decenol, undecylenyl alcohol, nonenol, citronellol, octenol, and heptenol; a cycloaliphatic alcohol with or without an unsaturated double bond, such as methylcyclohexanol, menthol, dimethylcyclohexanol, methylcyclohexenol, terpineol, dihydrocarveol, isopulegol, trimethylcyclohexenol; and the like. In particular, the alcohol co-solvent may be a terpineol solvent comprising a majority of alpha-terpineol by weight.

The conductive material 33 can be deposited on the piezoelectric element by any suitable method such as by screen printing, drop application, spraying, or ink jetting, rather than via sputtering or vapor depositing. In some embodiments, a patterned mask (not depicted) can be used in conjunction with the depositing method the conductive material 33 to provide patterned top electrode 34.

While embodiments have been illustrated with respect to one or more implementations, alterations and/or modifications can be made to the illustrated examples without departing from the spirit and scope of the appended claims. In addition, while a particular feature of an embodiment may have been disclosed with respect to only one of several implementations, such feature may be combined with one or more other features of the other implementations as may be desired and advantageous for any given or particular function. For example, one or more of the acts depicted herein may be carried out in one or more separate acts and/or phases.

Further, the term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein.

Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C.

Other embodiments will be apparent to those skilled in the art from consideration of the specification and practice of the embodiments disclosed herein. It is intended that the specification and examples be considered as exemplary only, with a true scope and spirit of the embodiments being indicated by the following claims.

What is claimed is:

1. A method for forming piezoelectric transducers for inkjet printheads, comprising:
   forming at least one piezoelectric layer on a substrate;
   forming a plurality of first electrodes by depositing, via a printhead, a jettable conductive material as jet droplets on an exposed surface of the at least one piezoelectric layer;
   dicing the at least one piezoelectric layer to form a plurality of individual piezoelectric elements from the at least one piezoelectric layer, wherein the dicing of the at least one piezoelectric layer is performed after the depositing of the jettable conductive material, and wherein a dicing blade used for performing the dicing does not contact the jettable conductive material when forming the plurality of individual piezoelectric elements; and
   forming a plurality of second electrodes by depositing, via the printhead, a second jettable conductive material as jet droplets on a second exposed surface of each of the plurality of individual piezoelectric elements, wherein each of the plurality of individual piezoelectric elements is disposed between a pair of the first and second electrodes, respectively.

2. The method of claim 1, wherein the depositing of the jettable conductive material from the printhead is in a predetermined pattern.

3. The method of claim 1, further comprising placing a pattern-mask over the at least one piezoelectric layer and wherein the jettable conductive material passes through openings of the pattern-mask and forms on the exposed surface of the at least one piezoelectric layer.

4. The method of claim 1, wherein a pattern-mask is used for preventing the depositing of jettable conductive material on at least one hold-back zone of the at least one piezoelectric layer.

5. The method of claim 1, wherein the plurality of first electrodes extend from a first edge to a second, opposing edge of a corresponding at least one of the plurality of individual piezoelectric elements.

6. The method of claim 1, wherein the depositing of the jettable conductive material comprises covering less than all of the exposed surface of the at least one piezoelectric layer.

7. The method of claim 1, wherein the jettable conductive material is a printhead-jettable conductive material.

8. The method of claim 1, wherein the jettable conductive material comprises a solution processable or printable silver-base conductive material.

9. The method of claim 1, wherein the jettable conductive material comprises a silver nanoparticle ink or a silver nanoparticle paste, wherein silver nanoparticles of the silver nanoparticle ink or of the silver nanoparticle paste have a diameter of from about 1 nm to about 50 nm.

10. The method of claim 1, wherein the substrate comprises a body plate cavity having a diaphragm and an adhesive that bonds to the plurality of second electrodes.

11. A method for forming piezoelectric transducers for inkjet printheads, comprising:
   forming at least one piezoelectric layer on a substrate;
   forming at least one electrode pattern by depositing, via a printhead, a jettable conductive material as jet droplets on an exposed surface of the at least one piezoelectric layer;
   dicing the at least one piezoelectric layer to form a plurality of individual piezoelectric elements from the at least one piezoelectric layer before or after the forming of the at least one electrode pattern, wherein the at least one electrode pattern comprises a plurality of first electrodes disposed on a first surface of each of the plurality of individual piezoelectric elements; and forming at least one of a second electrode pattern by depositing a second jettable conductive material via the printhead on a second surface of each of the plurality of individual piezoelectric elements,
wherein the second electrode pattern comprises a plurality of second electrodes, and
wherein each of the plurality of individual piezoelectric elements is disposed between one of the plurality of first electrodes and one of the plurality of second electrodes.

12. The method of claim 11, wherein the dicing of the at least one piezoelectric layer is performed before the depositing of the jettable conductive material.

13. The method of claim 11, wherein the substrate comprises a body plate cavity having a diaphragm and an adhesive that bonds to the at least one second electrode pattern.

14. The method of claim 11, further comprising:
forming an adhesive layer on a second substrate;
flip-bonding the plurality of individual piezoelectric elements onto the second substrate such that a top surface of the at least one electrode pattern contacts the adhesive layer.

* * * * *